United States Patent [19]
Nishikawa et al.

[11] Patent Number: 4,801,952
[45] Date of Patent: Jan. 31, 1989

[54] IMPROVED INK DOT PRINTER ELECTRODE STRUCTURE

[75] Inventors: Hisashi Nishikawa; Mitsuharu Endo; Masashi Shimosato, all of Shizuoka, Japan

[73] Assignee: Tokyo Electric Co., Ltd., Tokyo, Japan

[21] Appl. No.: 111,081

[22] Filed: Oct. 19, 1987

Related U.S. Application Data

[63] Continuation of Ser. No. 839,995, Mar. 17, 1986, abandoned.

[30] Foreign Application Priority Data

| | | | |
|---|---|---|---|
| Mar. 22, 1985 | [JP] | Japan | 60-57753 |
| Apr. 2, 1985 | [JP] | Japan | 60-69485 |
| Apr. 2, 1985 | [JP] | Japan | 60-69484 |

[51] Int. Cl.⁴ .......... G01D 15/16
[52] U.S. Cl. .......... 346/140 R
[58] Field of Search .......... 346/140; 400/126, 124; 101/DIG. 13, 426

[56] References Cited

U.S. PATENT DOCUMENTS

| | | | |
|---|---|---|---|
| 2,572,549 | 10/1951 | White | 346/140 X |
| 3,341,859 | 9/1967 | Adams | 346/140 |
| 4,333,086 | 6/1982 | Ebi | 346/140 |
| 4,383,265 | 5/1983 | Kohashi | 346/140 |
| 4,432,003 | 2/1984 | Barbaro | 346/140 |
| 4,549,243 | 10/1985 | Owen | 361/228 |
| 4,603,338 | 10/1984 | Nakayama | 346/140 |

FOREIGN PATENT DOCUMENTS

| | | |
|---|---|---|
| 0140658 | 5/1985 | European Pat. Off. . |
| 49-40432 | 8/1972 | Japan . |
| 53-57035 | 5/1978 | Japan . |
| 54-136331 | 10/1979 | Japan . |
| 56-63455 | 5/1981 | Japan . |
| 56-120358 | 9/1981 | Japan . |
| 2142880 | 1/1985 | United Kingdom . |

*Primary Examiner*—Joseph W. Hartary
*Attorney, Agent, or Firm*—Oblon, Fisher, Spivak, McClelland & Maier

[57] ABSTRACT

An ink dot printer includes a recording electrode and an operating electrode disposed in a mutually opposing relationship with a record medium interposed therebetween, and a potential difference is caused to appear between the electrodes so that ink around an end of the recording electrode is flown toward the record medium. The recording electrode is formed from a non-conductive member having an ink impregnability which is processed to provide electric conductivity on a surface thereof. Thus, an electric field is well concentrated at the end of the recording electrode, thereby assuring flying of ink from the end of the recording electrode to improve the stability of printing.

13 Claims, 5 Drawing Sheets

IMPROVED INK DOT PRINTER ELECTRODE STRUCTURE

This application is a continuation of application Ser. No. 839,995, filed on Mar. 17, 1986, now abandoned.

FIELD OF THE INVENTION AND RELATED ART STATEMENT

This invention relates to an ink dot printer wherein dots of ink are accumulated on a record medium to form a picture image, and more particularly to an ink dot printer wherein drops of ink are caused to fly to form dots by an electrostatic means.

Conventionally, ink dot printers wherein drops of ink are jetted from a nozzle to form a picture image have already been put on the market. However, ink dot printers of the type mentioned have a serious defect that a nozzle is choked up with ink. Thus, ink dot printers have been proposed wherein ink is held in a slit so as to prevent such choking with ink, as disclosed in Japanese laid-open patent No. 56-170. In particular, an opening of electrodes are disposed in an opposing relationship to the slit. However, ink dot printers of the type just mentioned have a drawback that drops of ink are not jetted from a fixed position of the slit so that they will not be applied to aimed positions on a record medium, resulting in failure in attaining stabilized printing.

Meanwhile, a variation wherein ink is held in a slit is disclosed in Japanese laid-open patents No. 56-4467 and No. 56-42664 and is illustrated in FIG. 23 of the accompanying drawings. In particular, referring to FIG. 23, a number of recording electrodes 2 are disposed in a slit 1 for holding ink therein, and a horizontally extending opposing electrode 4 is disposed in an opposing relationship to the recording electrodes 2 with record paper 3 as a record medium interposed therebetween. A switching element 5 is connected to each of the recording electrodes 2, and an electric source 6 is connected to produce a potential difference between the recording electrodes 2 and the opposing electrode 4 sufficient to fly ink therebetween.

In an ink dot printer having such a construction as described just above, in order to effect printing, the switching elements 5 are selectively turned on in response to a printing signal. As a result, a potential difference appears between the corresponding recording electrodes 2 and the opposing electrode 4 so that ink around the recording electrodes 2 will be flown toward the opposing electrode 4. Thus, ink in the slit 1 will move away from around the recording electrodes 2 to which a potential is applied and will be formed into drops of ink to fly. Accordingly, ink drops will fly accurately to aimed positions, thereby assuring stabilized printing.

A drawback of such a prior art will now be described. In the ink dot printer having the construction as described above, concentration of an electric field to the recording electrodes 2 is low, and hence stabilized flying of ink cannot be attained if the slit 1 and record paper 3 are not located sufficiently near to each other with a distance from 100 to 200 μm or so left therebetween. Accordingly, if the slit 1 and record paper 3 are relatively out of position, either some dots may drop from an intended picture image or on the contrary the record paper 3 may be soiled by ink.

OBJECTS AND SUMMARY OF THE INVENTION

It is a first object of the present invention to provide an ink dot printer wherein ink around ends of recording electrodes can be flown assuredly even if the recording electrodes are disposed far from a record medium.

It is a second object of the invention to provide an ink dot printer which can print at a high speed.

It is a third object of the invention to provide an ink dot printer which can print dots in high density.

It is a fourth object of the invention to provide an ink dot printer which can print dots at precise aimed positions.

It is a fifth object of the invention to provide an ink dot printer wherein ends of recording electrodes are always kept wet.

In order to attain those objects, according to the present invention, a recording electrode is formed by processing a non-conductive member having ink impregnability to provide electric conductivity on a surface of the non-conductive member. The recording electrode is projected at an end thereof toward an opposing electrode so that an electric field will readily concentrate at the end of the recording electrode, and hence flying of ink from the recording electrode will be assured. Accordingly, the distance between the end of the recording electrode and a record medium can be expanded, resulting in improvement in stability in printing. Besides, since ink flies from the end of the recording electrode, ink will constantly fly to aimed positions, resulting in improvement in accuracy of positions of dots formed.

DETAILED DESCRIPTION OF THE PREFERRED EMBODIMENTS

Figure 1:
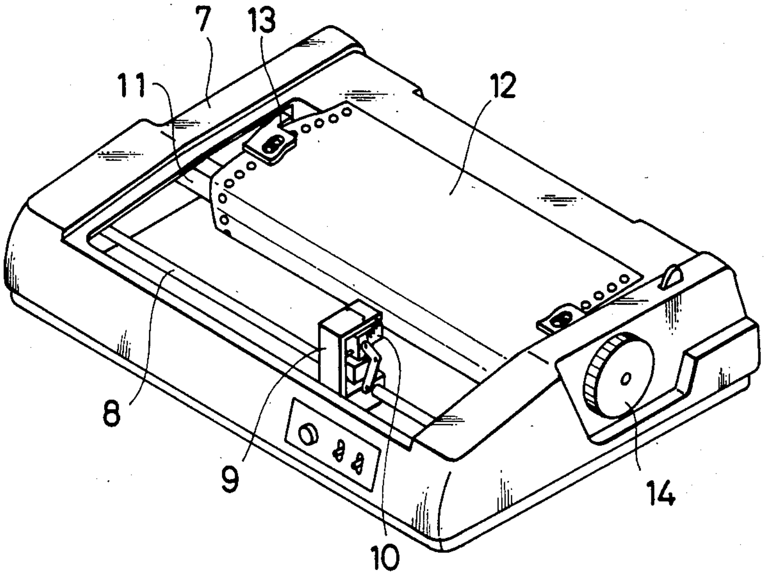
FIG. 1 is a perspective view of an entire ink dot printer illustrating a first embodiment of the present invention.

Now, a first embodiment of the present invention will be described with reference to FIGS. 1 to 6. A printer 7 shown includes a pair of guide rods 8 (only one is shown in FIG. 1) mounted to extend horizontally at a front part thereof. A carrier 9 is mounted for reciprocal leftward and rightward movement on the guide rods 8. A printing head 10 is mounted on the carrier 9. An opposing electrode 11 is mounted to extend horizontally at a central part of the printer 7 and is disposed in an opposing relationship to the printing head 10. A tractor 13 for transporting record paper 12 as a record medium is located between the opposing electrode 11. An operating knob 14 is coupled to the tractor 13 and extends sidewardly outwards of the printer 7.

A guide support shaft 15 is mounted on the carrier 9 and extends towards the opposing electrode 11. The printing head 10 is mounted for reciprocal movement on the guide support shaft 15 and is urged to move away from the opposing electrode 11 by means of a tension spring 16. A cap 17 is mounted for pivotal motion about a shaft 18 at an end of an upper portion of the carrier 9 and is urged by means of a tension spring 19 to a position in which it covers a front face of the printing head 10. A solenoid 20 is mounted at a lower portion of the carrier 9 and has a movable iron core 21 therein. An end portion of the movable iron core 21 is received in a slide guideway 24 formed at a mid portion of a substantially L-shaped lever 23 which is supported for pivotal motion at a lower end thereof by means of a shaft 22. Another slide guideway 25 is formed at an upper end portion of the lever 23, and a portion of the printing head 10 is received in the slide guideway 25.

Figure 4:
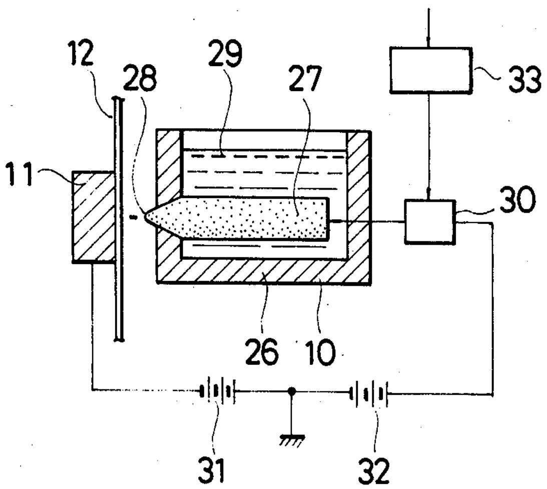
FIG. 4 is a diagrammatic vertical sectional side elevational view showing a printing head of the ink dot printer.
Figure 5:
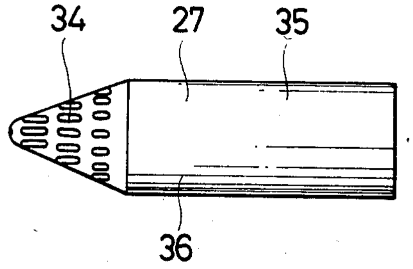
FIG. 5 is an enlarged side elevational view of a recording electrode of the printing head.
Figure 6:
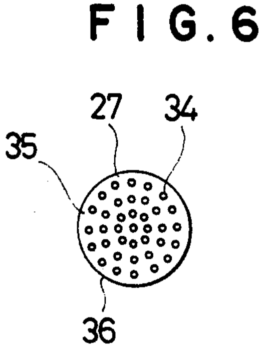
FIG. 6 is a front elevational view of the recording electrode.
Figure 7:
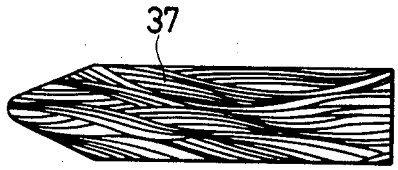
FIG. 7 is a side elevational view illustrating a modified form of an ink impregnated member constituting a recording electrode.
Figure 8:
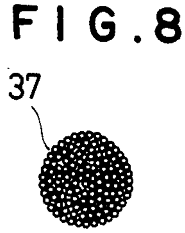
FIG. 8 is a front elevational view of the ink impregnated member of FIG. 7.
Figure 9:
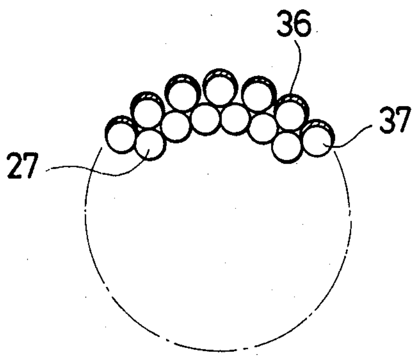
FIG. 9 is a similar view, in an enlarged scale, but illustrating the impregnated member with metal films adhered thereto.

Details of the printing head 10 are shown in FIG. 4. The printing head 10 includes a recording electrode 27 mounted in a casing 26 as an ink vessel. the recording electrode 27 has a conically formed end 28 which projects outwardly from a side wall of the casing 26. The recording electrode 27 is formed by a nonconductive member having an ink impregnability which is processed to provide electric conductivity on a surface thereoff. Ink 29 is filled in the casing 26.

Two high voltage power sources 31 and 32 are connected between the recording electrode 26 and the opposing electrode 11 by way of a high voltage switch 30. A junction between the high voltage power sources 31 and 32 is grounded. A printing controlling circuit 33 for generating a controlling signal in accordance with a picture signal is connected to the high voltage switch 30.

Figure 2:
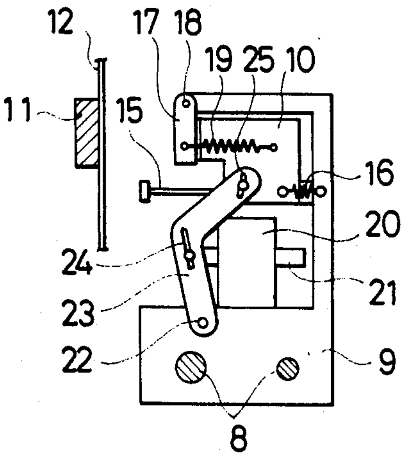
FIG. 2 is a side elevational view showing a carrier of the ink dot printer.
Figure 3:
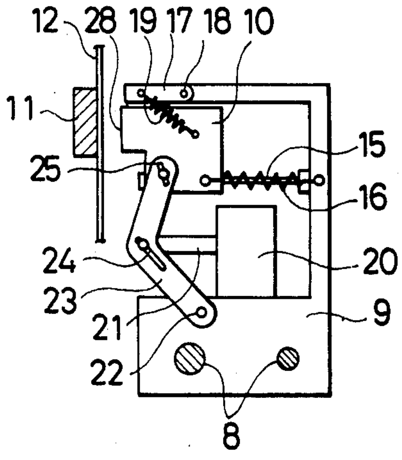
FIG. 3 is a similar view but showing the carrier in a printing condition.

In such a construction as described above, since the recording electrode 27 itself has an ink impregnability, ink 29 is supplied sufficiently to the end 28 of the recording electrode 27. Besides, since the ink 29 is held by the recording electrode 27, it will not drop thereof. Before printing operation, the solenoid 20 is energized. As a result, the movable iron core 21 is moved from a position as shown in FIG. 2 to another position as shown in FIG. 3. Upon such movement of the movable iron core 21, the printing head 10 will push and pivot the cap 17 to uncover the end 28 of the recording electrode 27. Then, after completion of a printing operation, the solenoid 20 is deenergized so that the printing head 17 is returned to its original position by a force of the tension spring 16 while the cap 17 is returned by a force of the tension spring 19 to its original position in which it covers the end 28 of the recording electrode 27 to effectively prevent drying of ink 29 during disuse. In this condition, if a signal is coupled to the high voltage switch 30 from the printing controlling circuit 33, a high voltage is applied between the recording electrode 27 and the opposing electrode 11 so that ink 29 will be flown toward the opposing electrode 11 by an electrostatic force. As a result, a dot is formed on record paper 12. A character or figure will thus be formed by repetitions of the operation. In this instance, the printing head 10 and the record paper 12 are controlled to move in a timed relationship to each other.

Now, concrete examples of individual members and dimensions of the same will be described. The ink 29 may be liquid ink having a viscosity of 6 cp and a specific resistance of $3\times10^7$ Ω-cm. The recording electrode may be one which is made by mixing fine power of alumina ($Al_2O_3$) with a binder, extrusion molding the mixture using a special method, sintering the molded mixture to form a thin through-hole pipe 35 having a large number of through-holes 34 extending in a longitudinal direction therein, and forming a metal film 36 on a surface 35 of the thin through-hole pipe 35. Here, the diameter of the thin through-hole pipe 35 is about 0.8 mm, and the diameter of the through-holes 34 is 50 μ or so. A ceramic member having such a large number of through-holes 34 therein is supplied under the name of a "thin ceramic through-hole pipe" from a firm of Pilot Precision Kabushiki Kaisha, and an article related to the ceramic member appeared in the Daily Industrial Newspaper (Nikkan Kogyo Shinbun) dated May 20, 1980.

As a material of the recording electrode 27, not only such a ceramic member as described above but also following materials can be used.

Figure 10:
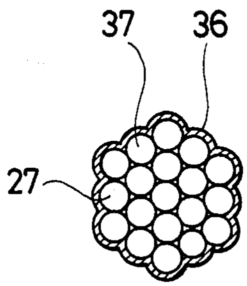
FIG. 10 is a similar view but illustrating the impregnated member with a metal file adhered thereto using a different process.
Figure 11:
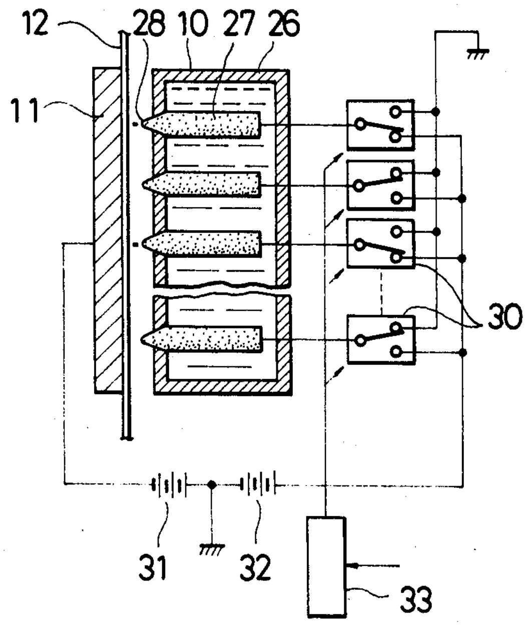
FIG. 11 is a diagrammatic horizontal sectional plan view illustrating a second embodiment of the invention.
Figure 12:
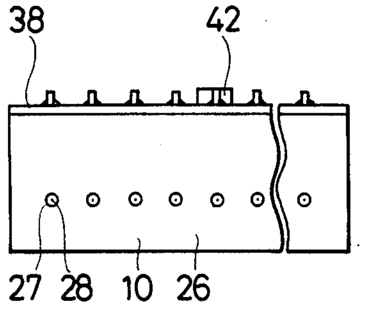
FIG. 12 is a front elevational view of the printer of FIG. 11.
Figure 13:
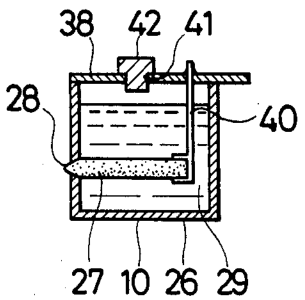
FIG. 13 is a vertical sectional side elevational view of the printer of FIG. 11.
Figure 14:
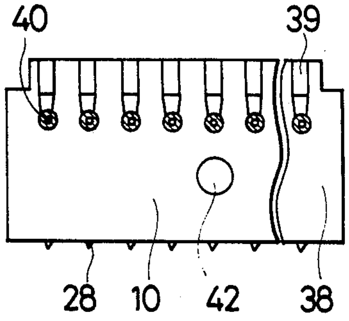
FIG. 14 is a plan view of the printer of FIG. 11.
Figure 15:
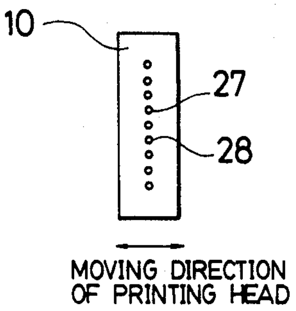
FIGS. 15 to 18 are front elevational views illustrating relations between a moving direction of a printing head and an arrangement of recording electrodes.

For example, a metal film 36 may be formed by sputtering on a bundle-formed member 37 which is formed by non-conductive fibers such as of polyacetal or polyester, as shown in FIGS. 7 to 10. The thickness of the metal film 36 may be 0.1 μ or so, and the metal film 36 may be adhered to one side face of the bundle-formed member 37. It is to be noted that the metal film 36 may be adhered to an entire periphery of the bundle-formed member 37 as seen in FIG. 10 by vacuum evaporation or the like while a bundle of fibers are exposed only at an end portion of the bundle-formed member 37 by masking, etching or the like.

Since the recording electrode 27 is projected at the end 28 thereof toward the opposing electrode 11, an electric field will readily concentrate at the end 28 of the recording electrode, thereby assuring flying of ink 29 from the recording electrode 27. Accordingly, the distance between the end 28 of the recording electrode 27 and the record paper 12 can be expanded while stability in printing is improved. At the same time, setup and maintenance of an apparatus can be improved. Besides, since ink 29 flies from the end 28 of the recording electrode 27, it will always fly to a fixed position so that accuracy in position of dots formed on record paper 11 can be improved.

Meanwhile, since a permeable porous material is used for the recording electrode 27, it is possible to hold liquid ink abundantly and stably at the end 28 of the recording electrode 27. Accordingly, even if the printing speed is raised, ink 29 can be supplied satisfactorily to the end 28 of the recording electrode 27, and therefore, printing at a high speed can be attained. Further, since the recording electrode 27 has a large number of paths of ink 29 up to the end 28 thereof, even if one of the paths is choked, circulation of ink 29 is assured by the remaining large number of ink paths. Accordingly, a highly reliable apparatus which eliminates choking with ink 29 can be attained.

Moreover, since ink 29 will permeate within the permeable porous recording electrode 27 by a capillary phenomenon, there is no need of provision of a special means for supplying ink 29 to the end 28 of the recording electrode 27. Further, no special ink such as magnetic ink is necessary, either. Accordingly, the printing head 10 can be very simplified in structure and can be formed as a stationary type head so that a reliable printer free from mechanical abrasion or wear can be produced at a low cost.

In addition, since there is no need of using special ink such as magnetic ink, the running cost of the printer can be reduced. Further, ink of a desired color can be available easily, facilitating printing in various colors.

Now, a second embodiment of the present invention will be described with reference to FIGS. 11 to 20. Like parts or components are designated by like reference numerals to those of the first embodiment and description of the same will be omitted herein. The present embodiment includes a large number of recording electrodes arranged in a row. The recording electrodes may each be such an electrode 27 as seen in FIG. 4. A high voltage switch 30 is provided for each of such recording electrodes 27, and all the high voltage switches 30 are connected to a printing controlling circuit 33.

Figure 16:
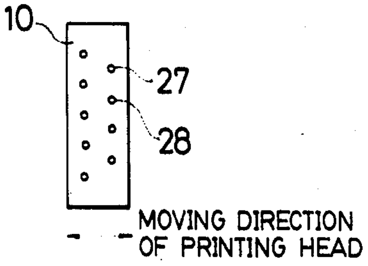
Figure 17:
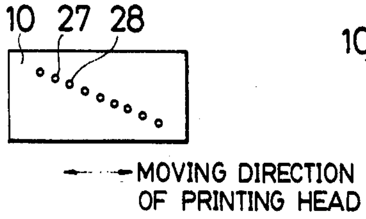
Figure 18:
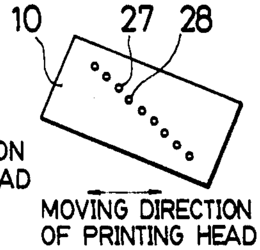

The top of the casing 26 is closed by the printed circuit board 38 on which a large number of connecting terminals 39 are formed. The connecting terminals 39 are connected each to a corresponding one of the recording electrodes 27 by means of a lead terminal 40. An ink supply hole 41 is formed in the printed circuit board 38 and is normally closed by a cap 42.

Where a large number of such recording electrodes 27 are provided in this manner, there may be various relations between the moving direction of the printing head 10 and the direction of an arrangement of the recording electrodes 27 as shown in FIGS. 15 to 18. In particular, in the arrangement of FIG. 15, the recording electrodes 27 are arranged in a row perpendicular to the moving direction of the printing head 10. In the arrangement of FIG. 16, the recording electrodes 27 are arranged in an alternate relationship in two rows in order to attain a reduced pitch between printed dots. In the arrangement of FIG. 17, the recording electrodes 27 are arranged in an oblique row in order to attain a reduced pitch between printed dots. And in the arrangement of FIG. 18, the printing head 10 is mounted in an obliquely inclined relationship so as to attain a similar effect to that of the arrangement of FIG. 17. If the dot pitch is reduced in this manner, the printing density can be increased, thereby allowing more natural printing to be attained.

Figure 19:
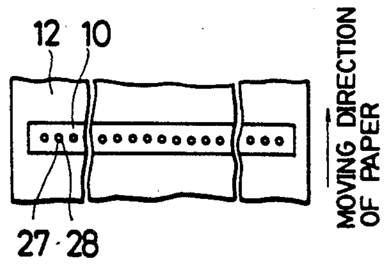
FIGS. 19 and 20 are front elevational views, in different scales, illustrating an example of a printing process.
Figure 20:
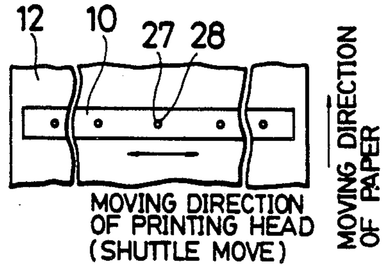

Referring now to FIG. 19, a different arrangement is shown wherein the recording electrodes 27 are arranged in the full width of the record paper 12. Meanwhile, FIG. 20 illustrates a further arrangement wherein the recording electrodes 27 are arranged in a rougher pitch, but if the printing head 10 is oscillated by a stroke corresponding to the pitch of the recording electrodes 27, similar printing to that as attained by the arrangement of FIG. 14 can be attained.

Figure 21:
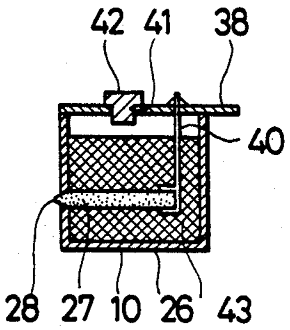
FIG. 21 is a vertical sectional side elevational view illustrating a third embodiment of the invention.

Now, a third embodiment of the present invention will be described with reference to FIG. 21. Like parts or components are designated by like reference numerals to those of the second embodiment and description thereof are omitted herein (this also applies to the fourth embodiment below). In the present embodiment, a permeable porous member 43 having a high electric insulation and worked into a predetermined shape is disposed within the casing 26. The porous member 43 is impregnated with ink 29. Accordingly, even if the printing head is mounted at a large angle or is subject to vibrations, ink 29 can be supplied more stably to the recording electrode 27.

Figure 22:
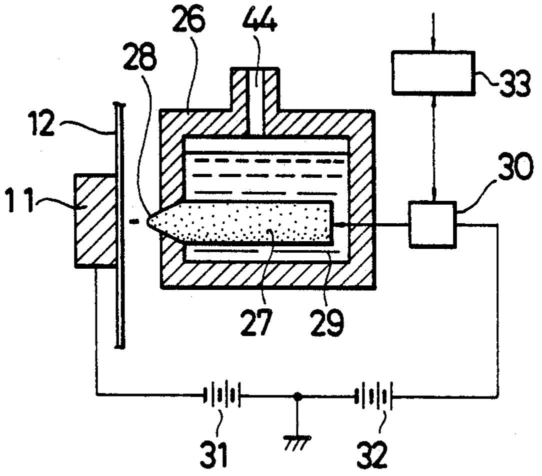
FIG. 22 is a diagrammatic vertical sectional side elevational view, in an enlarged scale, illustrating a fourth embodiment of the invention.
Figure 23:
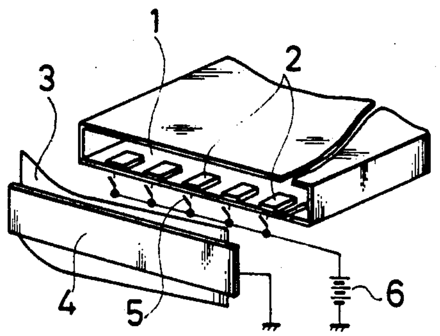
FIG. 23 (PRIOR ART)
FIG. 23 is a perspective view, in diagrammatic representation, illustrating part of a conventional ink dot printer.

A fourth embodiment of the invention will now be described with reference to FIG. 22. In the present embodiment, the casing 26 is formed air-tight and has a static pressure applying hole 44 formed in a top wall thereof and communicating with an external pump not shown so as to raise the internal pressure of the casing 26. Accordingly, if the internal pressure is adjusted in accordance with current situations, an optimum ink supply can be attained.

In place of such an ink supply using a pneumatic pressure, an external ink supply pump not shown may be connected to the casing 26 in order to supply ink 29.

It is to be noted that the present embodiment may be applied to the third embodiment as described hereinabove.

What is claimed is:

1. An ink dot printer comprising:

an opposing electrode and a recording electrode, having ink adhered to an end thereof, disposed in an opposing relationship with a record medium interposed therebetween, and a potential difference between said opposing electrode and said recording electrode in order to fly the ink of the end portion of said recording electrode toward the recording medium thereby to form a picture image on the recording medium;

wherein said recording electrode is a ink impregnable non-conductive member having a tapered shape at its tip and having an electrically conductive surface over the entirety of the surface including said tapered shaped tip.

2. An ink dot printer according to claim 1, wherein said non-conductive member is a thin through-hole pipe having a large number of through-holes formed in an axial direction therein.

3. An ink dot printer according to claim 2, wherein said thin through-hole pipe is formed by sintering a metal oxide material.

4. An ink dot printer according to claim 1, wherein said non-conductive member is a member consisting of fibrous elements which are united into the form of a bundle in such a manner as to leave gas permeability in a direction of the fibrous elements therein.

5. An ink dot printer according to claim 1, wherein an end of said recording electrode adjacent said opposing electrode is formed in a conical shape.

6. An ink dot printer comprising:

an opposing electrode and a plurality of recording electrode each having ink adhered to an end thereof are disposed in an opposing relationship with a record medium interposed therebetween, and a potential difference between said opposing electrode and said recording electrode in order to fly the ink of the end portion of said recording electrode toward the record medium thereby to form a picture image on the record medium;

wherein each of said recording electrodes is a ink impregnable non-conductive member having a tapered shape at its tip and an electrically conductive surface over the entirety of the surface including said tapered shaped tip whereby independent picture image signal voltages are applied to said recording electrodes in order to form a picture image.

7. An ink dot printer according to claim 6, wherein ends of said recording electrodes are arranged on a a straight line perpendicular to a scanning direction for printing.

8. An ink dot printer according to claim 6, wherein ends of said recording electrodes are arranged in an alternate relationship on two parallel straight lines perpendicular to a scanning direction for printing.

9. An ink dot printer according to claim 6, wherein ends of said recording electrodes are arranged on a straight line which is obliquely inclined relative to a scanning direction for printing.

10. An ink dot printer comprising:

an opposing electrode and a recording electrode, having ink adhered to an end thereof, disposed in an opposing relationship with a record medium interposed therebetween, and a potential difference between said opposing electrode and said recording electrode in order to fly the ink of the end portion of said recording electrode toward the record medium thereby to form a picture image on the record medium;

wherein said recording electrode is a ink impregnable non-conductive member having a tapered shape at its tip and an electrically conductive surface over the entirety of the surface including said tapered shaped tip, and wherein a part of said recording electrode communicates with an ink vessel.

11. An ink dot printer according to claim 10, wherein an end of said recording electrode is exposed externally of the conductive surface layer and is mounted in said ink vessel, and a static pressure higher than the atmospheric pressure is applied within said ink vessel by a static pressure applying means.

12. An ink dot printer according to claim 11, wherein said static pressure applying means serves also as an ink applying means.

13. In an ink dot printer of the type wherein an opposing electrode and a recording electrode having ink adhered to an end thereof are disposed in an opposing relationship with a record medium interposed therebetween, and a potential difference is caused to appear between said opposing electrode and said recording electrode to fly the ink of the end portion of said recording electrode toward the record medium thereby to form a picture image on the record medium, the improvement wherein said recording electrode is formed by processing a non-conductive member having a tapered shape at its tip and and ink impregnability to provide electric conductivity on a surface of said non-conductive member over the entirety of the surface including said tapered shaped tip, said recording electrode being disposed such that a portion thereof extends through the interior of an electrically insulating ink impregnated member.

* * * * *